United States Patent Office 2,996,384
Patented Aug. 15, 1961

2,996,384
CAKE MIX AND METHOD OF
PREPARING SAME
Charles C. Elsesser, Katonah, N.Y., assignor to General Foods Corporation, White Plains, N.Y., a corporation of Delaware
No Drawing. Filed July 21, 1960, Ser. No. 44,288
13 Claims. (Cl. 99—94)

This invention relates to cake mixes of the shortening-containing type and, particularly, to shortening cake mixes which have greatly improved ease of batter preparation and which, at the same time, result in cakes of improved quality in the hands of the average housewife. This is a continuation-in-part of Serial No. 451,945, filed August 24, 1954, now abandoned, and co-pending application, Serial No. 718,158, filed February 28, 1958.

Present day cake mixes contain, in general, the same basic ingredients as are employed by a housewife in preparing a cake from the individual ingredients. In the case of mixes to be used in preparing cakes containing shortening, the basic ingredients consist of flour, sugar and shortening. In addition, baking powder, dry milk solids, salt, flavoring, dried eggs, and the like, are usually employed. Where the mix does not contain dried eggs, the directions for preparation of the mix may call for the addition of one or more fresh eggs to the batter. At any rate, a typical mix of the type described is an intimate free-flowing mixture of dry ingredients and shortening.

Cake mixes of this type offer a considerable amount of convenience to the consumer in the form of a decreased amount of work required in cake preparation. A batter is prepared by simply adding to the mix an aqueous liquid, such as water or milk, and beating the batter in a conventional manner. Thus, the present mixes relieve the consumer of the work required in measuring and combining the portions of each ingredient required to prepare the batter and at the same time they eliminate variation in cake quality due to inaccurate weighing and measuring of the various ingredients going into the batter.

Present cake mixes have not, however, overcome the problem of the excessive amount of work that is required to properly combine the aqueous liquid with the mix. The technique which is presently preferred in batter preparation of prepared mixes is a multi-stage liquid addition technique which calls for the addition of portions of the total aqueous liquid required with beating after each addition. This procedure may be related to the "sugar-batter" or "flour-batter" methods described below with regard to regular cake baking and, in general, possess the same disadvantages.

In preparing cakes from individual ingredients, three basic methods have been commonly employed. These are known as the "sugar-batter," the "flour-batter" and the "single-stage" methods. In the sugar-batter method, sugar and shortening are first creamed together, the creaming is continued with the addition of eggs, and the mixing operation is completed by adding milk and flour in alternate small proportions with intimate mixing.

In the flour-batter procedure the shortening is creamed with the flour and the eggs and sugar are beaten together in a separate bowl. The two mixtures are combined and the milk added.

In the single-stage method the various procedural steps in the two methods previously described are omitted and all ingredients including aqueous liquids are placed in a bowl and beaten until the batter is suitably developed. Where a mixing machine is employed, approximately 10 minutes of beating is required, while a longer period is required for hand beating. The advantages of this latter procedure in convenience and simplicity are obvious, but it has not resulted in cakes of as good quality and volume as the other two methods and, hence, has not been widely employed. Further, the amount of work required in beating is the same or even greater.

Returning to the procedure employed with present day commercial cake mixes, it can be seen that a multi-stage liquid addition technique avoids the tiresome creaming stages in the sugar-batter and flour-batter methods and requires only that aqueous liquid be added in two or more portions during the preparation of the batter. Despite these advantages, an important difficulty arises in the execution of the multi-stage liquid addition batter preparation.

A good illustration of the problem involved here is given by a typical set of instructions for multi-stage liquid addition preparation of a yellow cake mix batter. In the first stage of batter preparation, approximately ½ cup of water or milk is added to 20 ounces of the mix and the batter is beaten for 300 strokes. Because of the small amount of aqueous liquid employed, the batter is stiff and gummy making the beating operation extremely difficult, particularly where the beating is carried out by hand.

The second stage requires the addition of two whole eggs followed by an additional 150 strokes of beating. The incorporation of the eggs at this stage tends to make beating somewhat easier, but nevertheless requires considerable effort. The remainder of the water (½ cup) is added in the third stage followed by 150 strokes of beating which is relatively easily accomplished because of the decreased viscosity of the batter.

Taking the batter preparation as a whole, a total of 600 strokes of beating are required, 450 of which are quite difficult. The term beating as used above defines an operation which is more than a simple stirring of the mixture, and when accomplished by hand denotes a very vigorous and tiring operation.

Because of the difficulty encountered by a housewife in preparing a batter by multi-stage procedures, particularly in the initial beating, the directions given by the manufacturer for batter preparation are often not properly executed by the housewife. This, of course, results in cakes of inferior quality although the mixes themselves are capable of providing a high quality cake if properly employed.

Attempts have been made in the past to adapt the single-stage method to cake batters prepared from cake mixes, but these attempts have in the main been unsuccessful. Cakes prepared from mixes employing a single-stage method have, as expected, resulted in cakes of inferior quality and volume, although the amount of work required in batter preparation has been less than that required in multi-stage preparation.

It has now been found that the amount of work required in preparing a batter from a shortening type of cake can be greatly reduced and that the quality of cakes prepared therefrom can be greatly improved by providing a water soluble salt of carboxymethyl cellulose in a mix containing emulsified shortening. This use of carboxymethyl cellulose provides a shortening cake mix suitable for preparation by a single-stage liquid addition technique and capable of providing baked goods of good quality and high volume. Instead of beating the mixes of this invention, all that is required is mere stirring of the mix and aqueous liquid for a number of strokes sufficient to obtain uniform hydration and dispersion of the ingredients. Where the aforementioned multi-stage technique required 600 strokes of difficult beating, the mixes of the present invention can be prepared by as little as 150 strokes of relatively easy stirring by hand. Where an electric mixer is employed with mixes containing the carboxymethyl cellulose mixing at medium speed, i.e., Speed No. 5 on a Model No. 10 Sunbeam Mixmaster, for one minute is sufficient to produce a cake of uniform high quality whereas 10–15 minutes would be otherwise required.

The batter density resulting from the reduced time and effort in batter preparation under the present invention is surprisingly low indicating an incorporation of air into the batter substantially comparable to that experienced in the preparation of conventional batters. This is surprising since it was previously believed that the short beating time permitted by the present invention would not be adequate to incorporate sufficient air into the batter to provide the desired low density.

Use of carboxymethyl cellulose has proved equally advantageous with multi-stage as well as single-stage mixes. One of the primary advantages of cake mixes of this invention is their improved tolerance of the addition of the aqueous liquid, either in one or a plurality of steps, while at the same time resulting in batter which on baking provides a high quality of cake from the standpoint of volume, texture and appearance.

Any water soluble salt of carboxymethyl cellulose may be employed. While the water soluble salt of carboxymethyl cellulose can have a viscosity of greater than above about 5 centipoises in a 1% water solution, it is desirable to use a carboxymethyl cellulose having a viscosity of about 5–3000 centipoises in a 1% water solution. Preferably, the carboxymethyl cellulose will have a viscosity of about 50–2200 centipoises in a 1% water solution and more preferably a viscosity of about 1200–2000 centipoises. Sodium carboxymethyl cellulose is the preferred water soluble salt. This material functions at very low levels in mixes of this invention; its use does not introduce excess solids which might interfere with the normal baking process. The amount of carboxymethyl cellulose employed in the cake mixes of this invention will vary. In the case of the preferred sodium salt of carboxymethyl cellulose having a viscosity in the aforementioned range, amounts up to 1.0% of the total solids of the mix have been found to provide the desired improvements. Amounts above this level can be employed but the resulting cakes are of coarse grain and poor texture generally; it is believed this is because of the increased amounts of interfering solids of the carboxymethyl cellulose introduced into the cake mix batter. Amounts below about 0.01% on the same basis may be employed but little if any benefit is obtained. The optimum amounts which may be employed will vary according to the type and flavor of the cake in which it is to be used. In the case of a white or vanilla cake, the preferred amount of sodium carboxymethyl cellulose is incorporated at a level of about 0.06%. On the other hand, levels of 0.4% in a devil's food cake, 0.2% in a yellow cake and 0.3% in a spice cake have been found to produce optimum results.

Another very interesting feature of the present invention has been the discovery that when carboxymethyl cellulose is employed in the compounding of cake mixes it is possible to employ a reduced shortening level provided the shortening has been emulsified. The term "emulsified shortening" as employed in the accompanying claims is intended to embrace animal and vegetable fats and oils having incorporated therein compositions having a hydrophilic as well as a hydrophobic nature such as the partial esters of polyhydroxy compounds and fatty acids. Included in this category are the partial esters of such polyhydroxy compounds as glycerol, propylene glycol, sorbitol, mannitol and other polyols and higher fatty acids such as stearic, palmitic, lauric, oleic, and behenic. It has been found that when carboxymethyl cellulose is employed in combination with emulsified shortening in shortening-cake mixes having a reduced shortening level, it allows one to employ a higher level of moisture in preparing batters from such mixes than can be employed when using other hydrophilic colloids in its stead in efforts to restore the eating quality which is lost at such reduced level of shortening. In other words, in shortening cake mixes employing emulsified shortening at a low level, i.e., below 8% and ranging from 1%–8%, and either not employing carboxymethyl cellulose or employing a hydrophilic colloid other than carboxymethyl cellulose, it has not been found possible to produce cakes having improved crumb texture and volume when employing high levels of moisture.

Most pronounced is the dramatic improvement in the features of cake quality and volume in so-called low shortening cakes prepared by a single-liquid addition technique and a short batter preparation period, e.g., one minute hand stirring; in such recipes the carboxymethyl cellulose serves not only to improve ease and effectiveness of batter hydration but also to achieve a desired reduction in batter viscosity during baking.

To explain, it has been found that the water soluble salts of carboxymethyl cellulose are uniquely suited to single-liquid addition type shortening cake mixes in that they endow the mix with a greater rate of hydration and a higher degree of hydration than is possible with an equal level of other hydrophilic colloidal solids; this is because the increase in batter viscosity occurs in a very short period of time; this increase is accompanied by more efficient distribution of the shortening and non-shortening phases of the batter. However, the carboxymethyl cellulose is also more uniquely suited to single-liquid addition techniques and techniques generally aimed at employing a higher level of moisture in lieu of a high level of emulsified shortening in that the batter is capable of thinning during the initial part of the baking cycle in order to permit the proper formation of the shortening cake cell structure. Thus, as distinguished from other hydrophilic colloids of the prior art, carboxymethyl cellulose allows the batter to lose the viscosity desired in batter preparation when such viscosity serves no useful purpose and is preferably reduced.

On the other hand, the carboxymethyl cellulose does not introduce premature thinning or too rapid a loss of viscosity of the batter during the baking operation and thereby allows a greater utilization of the leavening gases developed from baking powder during baking with consequent avoidance of cakes of low volumes having porous, sugary crusts, poor contours and poor cell structures.

In general, therefore, the water soluble salts of carboxymethyl cellulose have the capability of rapidly providing an initially high viscosity, which viscosity function is advantageously reduced in a controllable manner during the baking cycle so as to permit more ideal batter expansion during baking; this function is distinguishable from that provided by other hydrophilic colloids of the prior art.

The water soluble salts of carboxymethyl cellulose also offer the opportunity of suspending "inert" materials like flavoring chips or chunks as well as other novel flavoring substances which would be employed in compounding novel cake mixes. Included in this list of inert materials are chocolate chips, apple chips, orange and lemon bits, coconut flakes or shreds. Such inert substances would normally tend to reduce cake quality and volume even when employing emulsified shortenings at a high level in cake mixes. The problem is increasingly severe when it is attempted to reduce the level of shortening and it appears that the water soluble salts of carboxymethyl cellulose are capable of compensating the sensitivity of the batter to such extraneous substances.

In compounding shortening cake mixes in accordance with the present invention it is found desirable to incorporate the water soluble salt of carboxymethyl cellulose into intimate association with the non-shortening portion of the mix, viz., the flour and the sugar. In this way the rapid increase in viscosity of the batter is more readily achieved so that the physical force applied on mixing the shortening and non-shortening phases of the ingredients is more effective. This is a feature particularly desirable for cake mixes employing a level of emulsified shortening below 10% where more effective hydration and dispersion of dry ingredients throughout the aqueous liquid is desirable in overcoming the hydrophobic character of the mix.

As a specific example of the mixes of this invention, Table I describes by percentage range of various ingredients the formulation of a typical yellow cake mix. This mix is of the type where the eggs are added as fresh eggs by the housewife.

Table I

| Ingredients: | Percent by weight |
| --- | --- |
| Cake flour | 35.5–45.5 |
| Sugar | 41.0–53.5 |
| Emulsified shortening | 3.0–13.0 |
| Dry skim milk solids | 2.0–3.0 |
| Sodium chloride | 0.6–0.8 |
| Sodium bicarbonate | 0.60–0.75 |
| Sodium acid pyrophosphate | 0.8–1.2 |
| Sodium carboxymethyl cellulose (viscosity 1200–2000 centipoises in 1% solution) | 0.01–0. |

In combining the ingredients of this mix, it is generally preferred to prepare a pre-mix of all the dry ingredients excepting shortening and thereafter blend the pre-mix with shortening in a ribbon blender to obtain a uniform dispersion of the shortening throughout the dry ingredients. If so desired, the mix may be passed through a finishing or impact mill to assure that the mix will be free of lumps. The dry, free-flowing mix may then be packaged and distributed through commercial channels.

Batter prepared from the above-described mix may be beaten by hand or by an electric mixer. Where hand mixing is employed, the dry mix ingredients are placed in a bowl, one cup of milk or water is added together with two whole eggs, and the whole stirred by hand for approximately 150 strokes or until the batter appears to be uniformly mixed. The stirring here is very easily accomplished. Over-all viscosity of the batter is increased slightly over that experienced in normal single-stage techniques, while the viscosity of the batter remains low enough to permit batter preparation with relatively little effort. When mechanical mixing is employed, such as that provided by Model No. 10 Sunbeam Mixmaster, one minute is all that is required to prepare a batter from which a high quality cake will result.

The batter is then divided between two 8-inch layer cake tins and baked at 375° F. for 20–30 minutes. The resulting layers have an extremely good volume, each being 1300 cc. in the usual case, and are of an exceptionally high grade based on their shape, color, texture, grain and eating qualities.

Where an easy to mix, two-stage mixing procedure is desired, the ingredients of the above-described mix are first combined with ½ cup of water and the mixture stirred for about 100 strokes by hand. Following this step, an additional ½ cup of water and 2 whole eggs are added and the mixture stirred for an additional 50 strokes to complete the mixing operation.

The various other ingredients in the cake mixes of this invention are the same as those commonly employed in present day cake mixes. It is prefered to employ, for example, the usual patent cake flour, although it has been found that bread grade flours may be conveniently employed in some instances, if desired. With regard to the sugar component, sucrose, dextrose and other sugars commonly employed in cakes may, of course, be employed in these mixes. It is preferred that sucrose, such as confectioner's sugar, having a particle size at which 80–85% passes a U.S. Standard 200 mesh screen be employed, although all forms of sucrose including granulated may be employed if desired with little or no effect on cake quality. The advantage of employing a confectioner's sugar is most apparent with a supercooled liquid shortening. Its use gives a drier, fluffier, more free-flowing mix as compared to a mix containing a plastic shortening and granulated sugar.

Further, any of the types of shortening presently available for cake mixes, whether liquid, supercooled liquid or plastic, may be employed in this art to employ mono- and di-glyceride emulsifiers in conjunction with hydrogenated shortenings. In the mixes of this invention it is preferred to employ votated shortening and to include with said votated shortening a mono- and/or di-glyceride emulsifier in an amount approximately 10% of the total shortening composition when not employing a reduced shortening level, viz., 8% or below. When employing a reduced emulsified shortening level the level of emulsifier employed should be increased to between 20–40% by weight of the shortening composition, the emulsifier level varying inversely with the levels of triglyceride used. In employing reduced shortening levels, phospholipids and other surface-active agents like lecithin can be employed to advantage in the mix for dispersing the emulsifier and triglyceride.

Where devil's food, spice or similar cakes are desired, cocoa, various spices and other suitable flavoring agents may of course be employed.

It is also important in mixes to be prepared by single-liquid addition technique that the acid ingredient of the chemical leavening agent be of the slow acting type. The faster acting types, such as mono-calcium phosphate, may be employed but are generally found to be unsatisfactory, particularly after prolonged storage of the mix, as the thin batter allows much of the initially evolved $CO_2$ to escape from the batter. For that reason, it is preferred to employ a slower acting acid ingredient, such as sodium acid pyrophosphate or sodium aluminum sulfate, which has the advantage of releasing the bulk of its available $CO_2$ after the batter has been fully developed or in the initial baking stages.

It will be understood that while the invention has been described in part by means of specific examples, reference should be had to the appended claims for a definition of the scope of the invention.

What is claimed is:

1. A cake mix of the shortening-containing type and comprising an intimate dry mixture including flour and sugar having emulsified shortening dispersed therein, the improvement comprising a water soluble salt of carboxymethyl cellulose employed at a level of 0.01–1% by weight of the dry mix, said water soluble salt being uniformly distributed throughout the non-shortening portion of the mix.

2. A shortening type cake mix containing about 1–8% shortening and employing a normal level of egg which comprises an intimate dry mixture of the non-shortening portion of the mix ingredients and a water soluble salt of carboxymethyl cellulose having a viscosity of from 5–3000 centipoises in a 1% water solution and employed at a level of 0.01–1.0% by weight of the dry mix ingredients, said water soluble salt being uniformly distributed throughout the non-shortening portion of the mix ingredients.

3. A shortening type cake mix containing about 1–8% shortening and employing a normal level of egg which comprises an intimate dry mixture of the non-shortening portion of the mix ingredients and a water soluble salt of carboxymethyl cellulose having a viscosity of from 50–2200 centipoises in a 1% water solution and employed at a level of 0.01–1.0% by weight of the dry mix ingredients, said water soluble salt being uniformly distributed throughout the non-shortening portion of the mix ingredients.

4. In a cake mix of the shortening-containing type and comprising an intimate dry mixture including flour and sugar having emulsified shortening dispersed therein, the improvement comprising a water soluble salt of carboxymethyl cellulose having a viscosity of from 1200–2000 centipoises in a 1% water solution and employed at a level of 0.01–1% by weight of the dry mix, said water soluble salt being uniformly distributed throughout the non-shortening portion of the mix.

5. A cake mix according to claim 4 wherein the hydrophilic colloid is a sodium salt of carboxymethyl cellulose.

6. A method of preparing a dry cake mix of the emulsified shortening-containing type capable of batter preparation by the addition of the total requirement of aqueous liquid to the dry mix ingredients in one step comprising the step of uniformly mixing a water soluble salt of carboxymethyl cellulose having a viscosity of 1200–2000 centipoises in a 1% water solution and employed at a level of 0.01–1.0% by weight of the dry mix throughout the non-shortening portion of the mix ingredients.

7. A cake mix of the shortening-containing type comprising an intimate dry mixture of sugar, flour, a chemical leavening agent the acid ingredient of which is of the slow-acting type, and a water soluble salt of carboxymethyl cellulose having a viscosity of 1200–2000 centipoises in a 1% water solution and employed at a level of 0.01–1.0% by weight of the dry mix, together with emulsified shortening dispersed throughout said dry mixture, said water soluble salt of carboxymethyl cellulose being dispersed throughout the non-shortening portion of the dry mixture.

8. A cake mix according to claim 7 wherein the emulsified shortening is employed at a level of 1.0–8.0% by weight of the dry mix.

9. A cake mix according to claim 8 wherein the emulsifier is employed at a level of 40–20% by weight of the shortening composition.

10. A method according to claim 6 wherein the water soluble salt of carboxymethyl cellulose is the sodium salt.

11. A cake mix of the emulsified shortening-containing type which comprises an intimate dry mixture of the non-shortening portion of the mix ingredients and a water soluble salt of carboxymethyl cellulose having a viscosity of from 1200–2000 centipoises in a 1% water solution and employed at a level of 0.01–1.0% by weight of the dry mix ingredients, said water soluble salt being uniformly distributed throughout the non-shortening portion of the mix ingredients.

12. A process for preparing a shortening-containing cake from a single liquid addition cake mix containing an intimate dry mixture including flour, sugar, shortening, a chemical leavening agent, and a water soluble salt of carboxymethyl cellulose employed at a level of 0.01–1% by weight of the dry mix, said water soluble salt being uniformly distributed throughout the non-shortening portion of the mix which comprises adding to the mix in a single portion all of the aqueous liquid required to reconstitute the mix into a batter, whereby the plurality of liquid additions conventionally required to prepare the cake is avoided, stirring said aqueous liquid and said mix until the resulting batter is uniformly mixed and then baking.

13. The process according to claim 12 wherein the chemical leavening agent contains a slow acting type acid ingredient.

References Cited in the file of this patent

UNITED STATES PATENTS

| | | |
|---|---|---|
| 1,943,374 | Dreyfus | Jan. 16, 1934 |
| 1,964,940 | Epstein | July 3, 1934 |
| 2,052,028 | Harris et al. | Aug. 25, 1936 |
| 2,302,511 | Wallach | Nov. 17, 1942 |
| 2,611,704 | Jaeger | Sept. 23, 1952 |
| 2,662,015 | Griffin | Dec. 8, 1953 |
| 2,801,921 | Moses | Aug. 6, 1957 |
| 2,802,740 | Weaver et al. | Aug. 13, 1957 |
| 2,802,741 | Weaver et al. | Aug. 13, 1957 |

FOREIGN PATENTS

| | | |
|---|---|---|
| 592,011 | Great Britain | Sept. 4, 1947 |